United States Patent
Soellinger et al.

(10) Patent No.: US 12,083,636 B2
(45) Date of Patent: Sep. 10, 2024

(54) METHOD FOR PREPARING AN AUTOMATED WELDING METHOD FOR A WELDING PROCESS AND WELDING DEVICE FOR CARRYING OUT AN AUTOMATED WELDING METHOD

(71) Applicant: Fronius International GmbH, Pettenbach (AT)

(72) Inventors: Dominik Soellinger, Pettenbach (AT); Andreas Waldhoer, Pettenbach (AT); Josef Artelsmair, Pettenbach (AT)

(73) Assignee: Fronius International GmbH, Pettenbach (AT)

( * ) Notice: Subject to any disclaimer, the term of this patent is extended or adjusted under 35 U.S.C. 154(b) by 16 days.

(21) Appl. No.: 17/791,063

(22) PCT Filed: Oct. 18, 2021

(86) PCT No.: PCT/EP2021/078750
§ 371 (c)(1),
(2) Date: Jul. 6, 2022

(87) PCT Pub. No.: WO2022/084217
PCT Pub. Date: Apr. 28, 2022

(65) Prior Publication Data
US 2023/0018375 A1    Jan. 19, 2023

(30) Foreign Application Priority Data
Oct. 19, 2020   (EP) ..................................... 20202469

(51) Int. Cl.
*B23K 9/06*    (2006.01)
*B23K 9/067*   (2006.01)
(Continued)

(52) U.S. Cl.
CPC ............ *B23K 9/173* (2013.01); *B23K 9/0671* (2013.01); *B23K 9/125* (2013.01); *B23K 9/126* (2013.01)

(58) Field of Classification Search
CPC ........ B23K 9/06; B23K 9/067; B23K 9/0671; B23K 9/12; B23K 9/125; B23K 9/126; B23K 9/173
See application file for complete search history.

(56) References Cited

U.S. PATENT DOCUMENTS 9,833,857 B2    12/2017   Artelsmair
10,173,288 B2   1/2019    Wagner et al.
(Continued)

FOREIGN PATENT DOCUMENTS

CN    103282153 A    9/2013
CN    106944720 A    7/2017
(Continued)

OTHER PUBLICATIONS

International Search Report in PCT/EP2021/078750, dated Feb. 9, 2022.
(Continued)

*Primary Examiner* — Brian W Jennison
(74) *Attorney, Agent, or Firm* — Collard & Roe, P.C.

(57) ABSTRACT

A method for preparing an automated welding method for a welding process moves a welding torch with a consumable welding wire during a movement phase at a positioning speed from an actual to a desired start position of a welding seam, and bridges the distance of the welding wire end from the workpiece during a creep phase. The creep phase is at least partially carried out during the movement phase. The wire is moved toward the workpiece at a first specified forward feed speed until a first wire end-workpiece contact is detected, moved away from the workpiece after first (Continued)

contact detection and then recurrently moved away from the workpiece, and the contact is interrupted again upon detection of further contacts, and the movement of the welding wire towards the workpiece and movement away from the workpiece after the contact is repeated until the start position is reached.

19 Claims, 4 Drawing Sheets

(51) Int. Cl.
    *B23K 9/12*           (2006.01)
    *B23K 9/173*         (2006.01)

(56) References Cited

U.S. PATENT DOCUMENTS

| | | | |
|---|---|---|---|
| 10,792,751 B2 | 10/2020 | Kotera | |
| 11,103,962 B2 | 8/2021 | Wagner et al. | |
| 2002/0060211 A1* | 5/2002 | Marhofer | B23K 9/0286 |
| | | | 219/60 R |
| 2004/0188406 A1* | 9/2004 | Brabander | B23K 9/1735 |
| | | | 219/137.61 |
| 2014/0001166 A1* | 1/2014 | Peters | B23K 9/1006 |
| | | | 219/130.1 |
| 2015/0129582 A1* | 5/2015 | Cole | B23K 9/122 |
| | | | 219/60 R |
| 2016/0214198 A1* | 7/2016 | Hsu | G01C 25/00 |
| 2018/0304391 A1 | 10/2018 | Kotera | |
| 2020/0130094 A1 | 4/2020 | Davidson et al. | |
| 2020/0139474 A1 | 5/2020 | Mayer et al. | |
| 2022/0055137 A1* | 2/2022 | Söllinger | B23K 9/173 |

FOREIGN PATENT DOCUMENTS

| | | |
|---|---|---|
| CN | 109047990 A | 12/2018 |
| CN | 111097992 A | 5/2020 |
| EP | 2 216 125 A1 | 8/2010 |
| EP | 3 421 167 A1 | 1/2019 |
| JP | 2006026642 A | 2/2006 |
| JP | 2013056353 A | 3/2013 |
| JP | 2015058439 A * | 3/2015 |
| JP | 2018-183830 A | 11/2018 |

OTHER PUBLICATIONS

European Search Report in EP 20202469.1—1016, dated May 19, 2021, with English translation of relevant parts.

Chinese Office Action dated Nov. 30, 2022 in Chinese Application No. 202180010079.4, with English translation.

* cited by examiner

METHOD FOR PREPARING AN AUTOMATED WELDING METHOD FOR A WELDING PROCESS AND WELDING DEVICE FOR CARRYING OUT AN AUTOMATED WELDING METHOD

CROSS REFERENCE TO RELATED APPLICATIONS

This application is the National Stage of PCT/EP2021/078750 filed on Oct. 18, 2021, which claims priority under 35 U.S.C. § 119 of European Application No. 20202469.1 filed on Oct. 19, 2020, the disclosure of which is incorporated by reference. The international application under PCT article 21(2) was not published in English.

The invention relates to a method for preparing an automated welding method for a welding process, wherein a welding torch with a consumable welding wire is moved during a movement phase at a positioning speed from an actual position to a desired start position of a welding seam, which is to be produced during the welding process, and the distance of the end of the welding wire from the workpiece is bridged in that the welding wire is moved to the workpiece during a creep phase until the welding wire end contacts the workpiece, whereupon the welding process is started at the start position with ignition of an arc.

The invention further relates to a welding device for carrying out an automated welding method, comprising a welding torch with consumable welding wire, a welding current source, a feed device for the welding wire, and a control device.

In the case of a conventional welding ignition sequence in the case of an automated welding method with a consumable welding wire, for example a MIG/MAG (metal inert gas/metal active gas) welding, the robot positions the welding torch to the start position of the welding seam and sends the welding start command to the welding apparatus. The welding current source starts the welding process only when the start signal was received by the robot from the current source. The ignition process is initiated by means of the welding current source in that the wire feed is started, and the no-load voltage is applied to the welding wire. So that the arc can be ignited by means of a contact ignition, the distance between the free welding wire end and the workpiece has to be bridged during a so-called creep phase. A very low wire feed speed is selected for a stable ignition of the arc during the ignition process and also during the creep phase.

As a function of the set wire feed speed during the creep phase and the distance between welding wire and workpiece, an additional corresponding delay of the weld start, which can be in the range between 50 ms and 500 ms, depending on the distance between the free welding wire end and the workpiece, thus results after the welding torch has reached the start position. In the case of a workpiece with many individual welding seams, these delays add up in response to each ignition, which results in a corresponding unwanted increase of the cycle time of a welding cell.

JP 2013 056353 A1 describes a control device for a welding robot, by means of which an overlap connection of two workpieces is measured in that the surface of the workpieces is measured by means of the tip of the welding wire in that the welding torch is moved with a fixed stick-out length of the welding wire, and the contact of the welding wire with the workpiece is detected.

EP 2 216 125 A1 describes, for example, a method for controlling the ignition process of a welding method with corresponding detection of the contact of the welding wire end on the workpiece surface and subsequent control of the forward and backward movement of the welding wire.

EP 3 421 167 A1 describes a method and a device for scanning a workpiece surface of a metallic workpiece, wherein the welding wire is recurrently moved back and forth to the workpiece surface in order to detect scanning values at scanning positions, and a contact of the welding wire end with the workpiece is detected.

The object of the present invention lies in the creation of an above-mentioned method for preparing an automated welding method for a welding process as well as a welding device for carrying out an automated welding method, by means of which the above-described delays during the ignition process can be minimized and cycle times can thus be optimized. The above-described disadvantages of the prior art are to be avoided or at least reduced.

With regard to the method, the object according to the invention is solved in that the creep phase is carried out at least partially during the movement phase, and the welding wire is moved in the direction of the workpiece at a first specified forward feed speed during the movement phase until a first contact of the welding wire end with the workpiece is detected, the welding wire is moved away from the workpiece after detection of the first contact, and the welding wire is then recurrently moved away from the workpiece and the contact is interrupted again in response to the detection of further contacts, and the movement of the welding wire to the workpiece until the welding wire end contacts the workpiece and movement away from the workpiece after the contact is repeated until the start position of the welding torch is reached. According to the invention, a sequence is carried out, in response to which the robot control already sends a command to the current source during the movement phase of the welding torch from its actual position to the desired start position at the start of the desired welding line, in order to prepare the welding wire or the free end thereof, respectively, for a minimal distance to the workpiece. In the case of the prior art, in contrast, the creep phase is started only after reaching the start position of the welding seam. According to the invention, the welding current source thus starts a sequence during the movement phase, in that the welding wire is conveyed in the direction of the workpiece. When the welding wire contacts the workpiece, this contact is detected and the welding wire is moved away from the workpiece again, thus backward, until the contact is interrupted again. The welding wire is then positioned so that the welding wire end is spaced apart as closely as possible, for example 0.05 mm to 1 mm, from the workpiece. The welding wire is subsequently moved forward or is also stopped. In response to repeated contact with the workpiece, a backward movement over a specified distance takes place again. This sequence is carried out cyclically, whereby a minimal distance between welding wire end and workpiece is always established. When the final start position is now reached by the robot and the welding process is started, only a minimal distance of, for example, 1 mm, has to still be bridged. Due to this sequence, the creep phase is reduced to only a few milliseconds and the influence of the number of ignitions on the cycle time of a welding method can be reduced greatly. The method according to the invention can be implemented relatively easily and cost-efficiently.

During the movement phase after detection of the first contact, the welding wire is advantageously moved away from the workpiece at a specified backward feed speed during a specified first time period, and the welding wire is then recurrently moved away from the workpiece in response to the detection of further contacts at a specified backward feed speed during a specified first time period, wherein the backward feed speed is preferably adapted individually in response to each movement of the welding wire away from the workpiece until the start position of the welding torch is reached. Due to the individual specification of corresponding fixed parameters for the backward feed speed of the welding wire and the time period of the backward movement, the method can be implemented relatively easily.

According to a further feature of the invention, it is provided that the welding wire is moved at a specified second forward feed speed in the direction of the workpiece for a specified second time period during the movement phase after the backward movement of the welding wire from the workpiece after detection of a contact of the welding wire end with the workpiece. Due to the fact that the welding wire is already located in the vicinity of the surface of the workpiece after the first contact with the workpiece, it is advantageous to select this second forward feed speed to be lower than the first forward feed speed prior to the first contact of the welding wire end with the workpiece.

When the welding wire is moved a specified distance in the direction of the workpiece after the backward movement of the welding wire from the workpiece after detection of a contact of the welding wire end with the workpiece, it can be prevented that an excessive free wire length protrudes from the welding torch, which could be bent in response to contacting the workpiece surface.

The creep phase is preferably carried out for a specified period of time after the start of the movement phase. Due to a time delay of this type, which is generally formed to be small, it can be prevented that the creep phase is started too soon, while the welding torch is still spaced apart relatively far away from the workpiece.

The contact of the welding wire end with the workpiece can be detected, for example, via a drop of the welding voltage. A corresponding no-load voltage is thereby applied to the welding wire during the creep phase, and the contact of the welding wire end with the metallic workpiece, thus a short-circuit between welding wire and workpiece, is detected due to the drop of the no-load voltage.

In the alternative or in addition, the contact of the welding wire end with the workpiece can also be determined via a feed device for the welding wire. The contact of the welding wire with the workpiece is detected thereby by detecting the force or force change on the motor or also by means of a speed change of the feed device. An increased power consumption or current consumption of the feed device can further suggest a contact of the welding wire with the workpiece. In contrast to the above-described electrical detection method, this detection method is more robust with regard to possible slag adhering to the welding wire end, which could prevent a reliable short-circuit detection due to the insulating effect. In special cases, vibrations or acoustic signals in response to contact of the welding wire with the workpiece could also be used for the detection. It is also possible in special cases to optically detect the contact via a camera system.

When the backward feed speed of the welding wire during the movement phase is larger than the positioning speed of the welding torch in the direction of the workpiece during the movement phase, it can be ensured that a contact of the welding wire end with the workpiece is interrupted again. On average, the backward feed speed of the welding wire is in particular at least 1.5 times as large, preferably at least 2 times as large, particularly preferably at least 5 times as large, as the positioning speed of the welding torch in the direction of the workpiece. If the average positioning speed of the welding torch in the direction of the workpiece is not known, at least the maximum value of the positioning speed of the welding torch in the direction of the workpiece should be used as basis for the backward feed speed of the welding wire. Otherwise, the welding wire would permanently contact the workpiece up to the start position, starting with the first contact. If the positioning speed of the welding torch in the direction of the workpiece is not known, it would obviously also be possible to select a speed for the backward feed speed of the welding wire, which is lower than was used as the basis for the positioning speed of the welding torch in the direction of the workpiece. The duration of the short-circuit of the welding wire end with the workpiece would need to be monitored thereby, and a threshold value for the duration of the short-circuit would need to be determined beforehand. If a short-circuit is determined during the creep phase, and if the threshold value is reached or exceeded for the duration of the short-circuit, a certain action can be triggered. A possible action would be that the backward feed speed of the welding wire is set to be larger than the maximum positioning speed of the welding torch in the direction of the workpiece. A further possible action would be to increase the backward feed speed of the welding wire, for example dynamically or in stages or cyclically, respectively, until the short-circuit is broken.

When the forward movement of the welding wire in the direction of the workpiece during the movement phase after reaching a specified maximum free wire length is stopped, it can be prevented that a free welding wire piece, which is too long, protrudes from the welding torch or contact pipe, respectively, which could be bent slightly in response to repeated contact with the workpiece.

The forward movement of the welding wire in the direction of the workpiece during the movement phase prior to the first contact of the welding wire end with the workpiece is in particular stopped after reaching a specified maximum free wire length of 5 mm to 50 mm, preferably 20 mm to 30 mm. Depending on material and diameter of the welding wire, these values represent suitable lengths, at which no bending of the welding wire in response to contact with the workpiece occurs.

The welding wire is advantageously moved in the direction of the workpiece during the movement phase at a first specified forward feed speed between 0.5 m/min and 200 m/min, in particular between 1.5 m/min and 20 m/min. This represents suitable values for the first forward movement of the welding wire during the movement of the welding torch from the actual position to the start position.

During the movement phase after the backward movement of the welding wire from the workpiece after detection of a contact of the welding wire end with the workpiece, the welding wire is moved in the direction of the workpiece at a specified second forward feed speed between 0.5 m/min and 200 m/min, in particular between 1.0 m/min and 10 m/min. Due to the fact that the welding wire is already relatively close to the workpiece after the first contact with the workpiece, it is advantageous to select the second forward feed speed to be lower than the first forward feed speed.

During the movement phase, the welding wire is moved away from the workpiece, preferably at a specified backward feed speed between 0.5 m/min and 200 m/min, in particular between 5 m/min and 60 m/min. The backward movement, in turn, can take place more quickly than the forward movement and can be set individually.

When a protective gas is activated during the movement phase a specified time period after the detection of the first contact of the welding wire end with the workpiece, the consumption of protective gas can be reduced and costs can thus be saved because the protective gas is switched on only shortly prior to the start of the welding method or ignition method, respectively, when it is required. The specified time period can be, for example, 0 to 10 s. It is likewise conceivable that the time period is determined and maximized by means of a preceding learning phase and parameter finding of the welding method, in combination with an adaptive welding device in order to minimize the amount of consumed protective gas and thus the costs for the protective gas, with consistent quality of the welding seam.

The object according to the invention is also solved by means of an above-mentioned welding device for carrying out an automated welding method, wherein the control device is formed for carrying out the above-described method. With regard to the advantages, which can be attained thereby, reference is made to the above description of the method. The welding device can be realized relatively easily because the necessary components, such as the control of the movement of the welding wire as well as the necessary components for the detection of a contact of the welding wire end with the workpiece, are generally already present.

The present invention will be described in more detail on the basis of the enclosed drawings, in which.

Figure 1A:
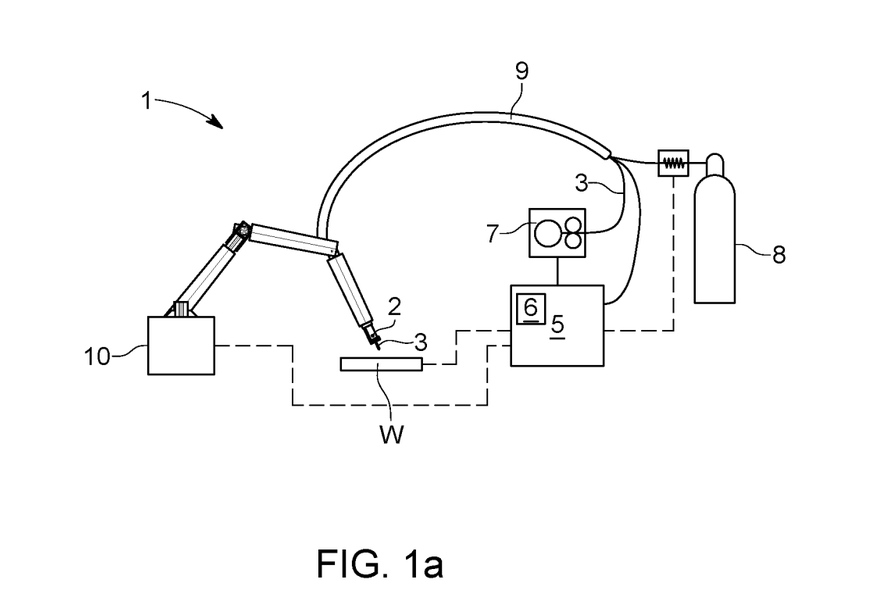
FIG. 1a shows a schematic image of a welding device for carrying out an automated welding method.

FIG. 1a shows a schematic image of a welding device 1 for carrying out an automated welding method. The welding device 1 includes a welding torch 2 for a consumable welding wire 3, which is moved by a robot 10 or similar manipulator for the automated welding method. The welding torch 2 is connected to a welding current source 5 and to a feed device 7 as well as usually to a gas tank 8 for a protective gas G via a hose package 9. A corresponding control device 6, which specifies the time courses of all components, is located in the welding current source 5.

Figure 1B:
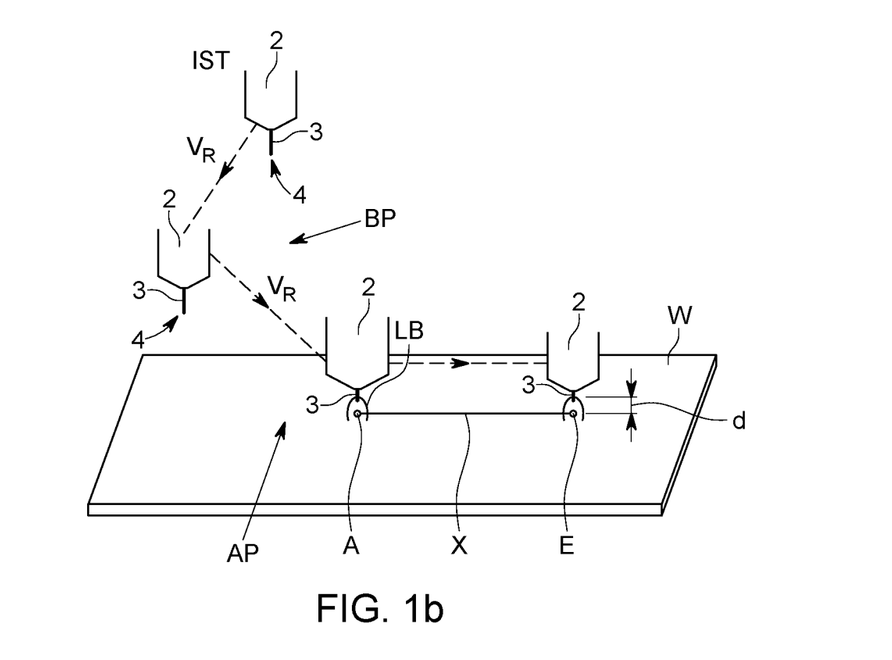
FIG. 1b shows an illustration of the movement of a welding torch to the start position of a welding seam and while carrying out a welding process.

FIG. 1b shows the illustration of the movement of a welding torch 2 to the start position A of a welding seam X and for carrying out a welding process SP according to the prior art. Prior to the start of an automated welding method, the welding torch 2 is on a specific actual position IST. Prior to starting a welding process SP, during which a welding seam X from a start position A to an end position E is to be welded, the welding torch 2 has to be moved from the actual position IST to the desired start position A during a movement phase BP. The movement takes place at a corresponding positioning speed $v_R$ of the welding torch 2. After the movement phase BP, the distance d of the end 4 of the welding wire 3 to the workpiece W is bridged in that the welding wire 3 is moved to the workpiece W during a subsequence creep phase AP at a usually relatively low forward feed speed until the welding wire end 4 contacts the workpiece W. After the contact, the welding process SP can be started with ignition of the arc LB. The creep phase AP can sometimes be relatively long, for example between 50 ms and 500 ms, which can lead to unwanted delays in the cycle time in the case of a plurality of welding seams X.

According to the invention, the creep phase AP is thus already carried out at least partially during the movement phase BP, and the welding wire 3 is moved at a first specified forward feed speed $v_{dV1}$ in the direction of the workpiece W during the creep phase AP until a first contact of the welding wire end 4 with the workpiece W is detected. After the detection of the first contact of the welding wire end 4 with the workpiece W, the welding wire 3 is moved away from the workpiece W again, and the welding wire 3 is then recurrently moved away from the workpiece W in response to the detection of further contacts and the contact is interrupted again, and the movement of the welding wire 3 to the workpiece W is repeated until the welding wire end 4 contacts the workpiece W and is moved away from the workpiece W after the contact until the start position A of the welding torch 2 is reached. An approach of the welding wire end 4 to the surface of the workpiece W thus already takes place during the movement phase BP, so that the welding wire end 4 is always spaced apart from the workpiece W only by a small distance d when reaching the welding torch 2 at the start position A of the welding seam X, and the ignition process can be continued right away, and the welding process SP can be started.

Figure 2:
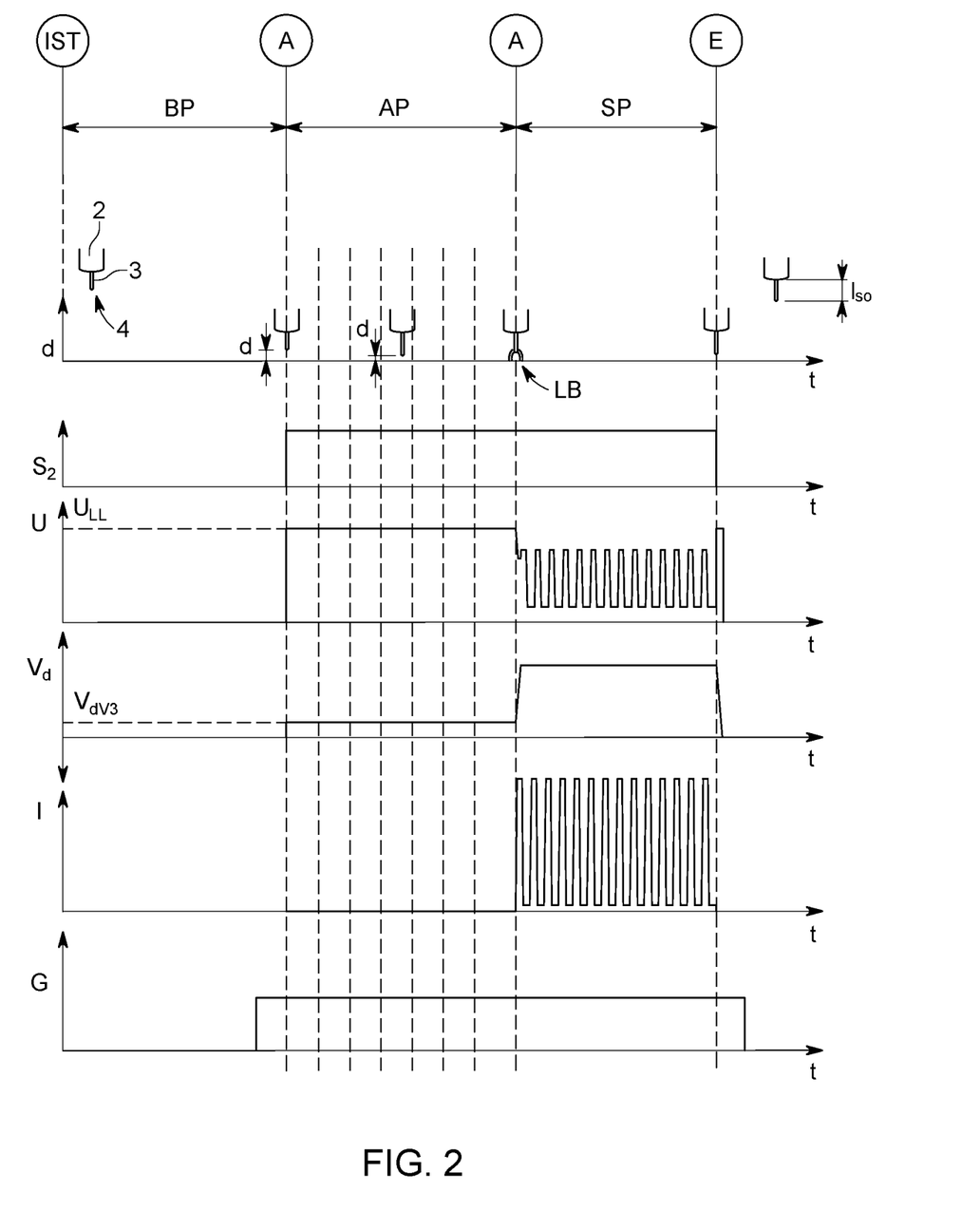
FIG. 2 shows the time courses of the positioning movement of a welding robot carrying the welding torch, of the distance of the end of the consumable welding wire from the workpiece, of the welding start command, of the welding voltage, of the feed speed of the welding wire, of the welding current, and of the activation of the protective gas prior to carrying out a welding process according to the prior art.

FIG. 2 shows, schematically, the time courses of the positioning movement of a welding torch 2 carried by the welding robot 10, of the distance d of the welding wire end 4 of the consumable welding wire 3 from the workpiece W, of the welding start command S2, of the welding voltage U, of the feed speed $v_d$ of the welding wire 3, of the welding current I, and of the activation of the protective gas G prior to carrying out a welding process SP according to the prior art. During a movement phase BP, the welding torch 2 is moved by means of the robot 10 at a positioning speed $v_R$ to the start position A of the welding seam X. During the creep phase AP, the welding wire 3 is then moved to the workpiece W, whereby the distance d between welding wire end 4 and surface of the workpiece W is reduced more and more. To prevent that the welding wire 3 impinges on the surface of the workpiece W at an excessive speed, a relatively low forward feed speed $v_{dv3}$ of the welding wire 3 is selected during the creep phase AP. The creep phase AP can last correspondingly long. During the creep phase AP, the no-load voltage $U_{LL}$ is applied to the welding wire 3. If the welding wire end 4 contacts the surface of the workpiece W, the drop of the no-load voltage $U_{LL}$ is detected, and an arc LB can be ignited, whereupon the welding current I rises accordingly, and the welding process SP can be started. During the welding process SP, the welding current I or the welding voltage U, respectively, and the feed speed $v_d$ of the welding wire 3 are controlled accordingly until the end position E of the welding seam X is reached. The welding process SP is then ended. In the case of the common use of a protective gas G, for example of argon, the supply of the protective gas G is already started with the onset of or during the movement phase BP, which is why a relatively large amount of protective gas G is wasted prior to the ignition of the arc LB at the start of the welding process SP.

Figure 3:
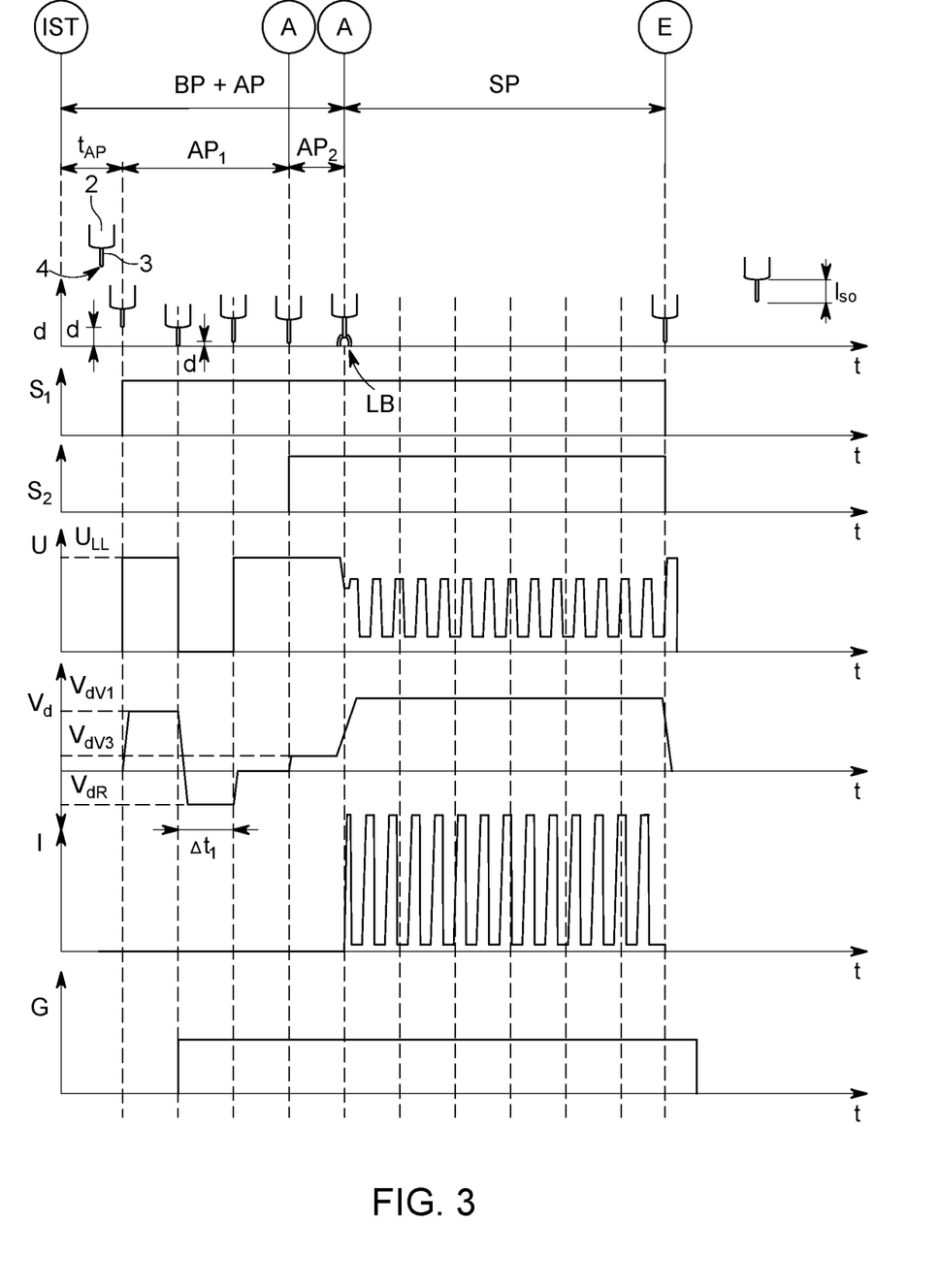
FIG. 3 shows the time courses of the positioning movement of a welding robot carrying the welding torch, of the distance of the end of the consumable welding wire from the workpiece, of the start command for the creep phase, of the welding start command, of the welding voltage, of the feed speed of the welding wire, of the welding current, and of the activation of the protective gas prior to carrying out a welding process according to a first embodiment of the method according to the invention.

FIG. 3 shows the time courses of the positioning movement of a welding robot 10 carrying the welding torch 2, of the distance d of the welding wire end 4 of the consumable welding wire 3 from the workpiece W, of the start command S1 for the creep phase AP, of the welding start command S2, of the welding voltage U, of the feed speed $v_d$ of the welding wire 3, of the welding current I, and of the activation of the protective gas G prior to carrying out a welding process SP according to a first embodiment of the method according to the invention. In contrast to the prior art (FIG. 2), the creep phase AP is already carried out during the movement phase BP, during which the welding torch 2 is moved from the actual position IST to the start position A of the welding seam X by means of the robot 10 at a positioning speed $v_R$, and the distance d of the welding wire end 4 to the surface of the workpiece W is decreased. This takes place in that the welding wire 3 is moved in the direction of the workpiece W at a first specified forward feed speed $v_{dV1}$ until a first contact of the welding wire end 4 with the workpiece W is detected. The distance d of the welding wire end 4 to the surface of the workpiece W changes continuously during the movement phase BP by means of the forward and backward movement of the welding wire 3, and preferably lies between 0 mm and a maximum value defined by the specified backward feed speed $v_{dR}$ of the welding wire 3 and the specified first time period $\Delta t_1$, after the first contact of the welding wire end 4 with the surface of the workpiece W. The detection can take place by the drop of the no-load voltage $U_{LL}$ or by measuring the force or force change at the motor or also by detection of a speed change of a feed device 7. After detection of the first contact, the welding wire 3 is moved away from the workpiece W at a backward feed speed $v_{dR}$, and the contact is interrupted again. The backward movement of the welding wire 3 can thereby take place for a specified first period of time $\Delta t_1$, wherein the specified first period of time $\Delta t_1$ corresponds at least to the period of the short circuit of the welding wire end 4 with the workpiece W. In this exemplary embodiment, the welding wire 3 is then stopped.

When the welding wire 3 is moved a specified distance $\Delta l$ in the direction of the workpiece W during the movement phase BP after the backward movement of the welding wire 3 away from the workpiece W after detection of a contact of the welding wire end 4 with the workpiece W, it can be prevented that an excessive free wire length $l_{so}$ ("stick-out") protrudes from the welding torch 3, which could be bent when contacting the workpiece surface (not illustrated). Such a case could arise when irregularities are located on one or also on several workpiece surfaces in the movement path of the welding wire 3 or of the welding wire end 4, respectively, during the positioning. This movement path during the positioning is understood to be that region in the space, which the welding wire end 4 passes through or spans, respectively, during the movement phase BP. On the one hand, this movement path thus consists of the movement of the welding robot 10 from the actual position IST to the start position A and, on the other hand, by the overlapped forward and backward movement of the welding wire 3. A bending of the free welding wire end 4 when contacting the workpiece W could occur when gaps, joint gaps, holes, pores, bores, rough or uneven mechanical machining grooves, or similar irregularities are located in the movement path, in the region of one or several workpiece surfaces, and a contact with a workpiece surface thus does not take place. Elevations or raised points, respectively, on the workpiece surface could further also lead to problems. Insufficiently deburred workpieces W, irregular joint gaps, contaminations, weld spatters, but also general surface errors of the workpieces W are mentioned here, for example. Workpieces W with a general surface texture, a directed texture, or an uncommonly high surface roughness could further also unintentionally bend the welding wire 3. The process of the forward and backward movement of the welding wire 3 could be repeated until the welding torch 2 has reached the start position A of the welding seam X. The arc LB is then ignited and the welding process SP is started. After reaching the end position E of the welding seam X, the welding process SP is ended. Due to the fact that the creep phase AP is already carried out during the moment phase BP, and the distance d of the welding wire end 4 from the workpiece W is minimized or bridged, respectively, the creep phase AP can be reduced significantly in time compared to the prior art, and the cycle time of the welding method can thus be increased.

The creep phase AP can be divided into a first creep phase AP1, which is already carried out during the movement phase BP of the welding robot 10, and a second creep phase AP2, which is carried out after reaching the start position A of the welding seam X. The first creep phase AP1 is thereby the part of the creep phase AP according to the invention, while the second creep phase AP2 corresponds to the creep phase AP known from the prior art.

The supply of the protective gas G can take place as a function of the detection of the first contact of the welding wire end 4 with the workpiece W or a specified time period $\Delta t_G$ after the detection of the contact, whereby protective gas G can be saved during the movement phase BP. A specified time period $\Delta t_G$ of 0 s, i.e., a turn-on of the protective gas G immediately after the first contact of the welding wire end 4 with the workpiece W, is illustrated in FIG. 3. The specified time period $\Delta t_G$ is thus not illustrated explicitly in FIG. 3.

Figure 4:
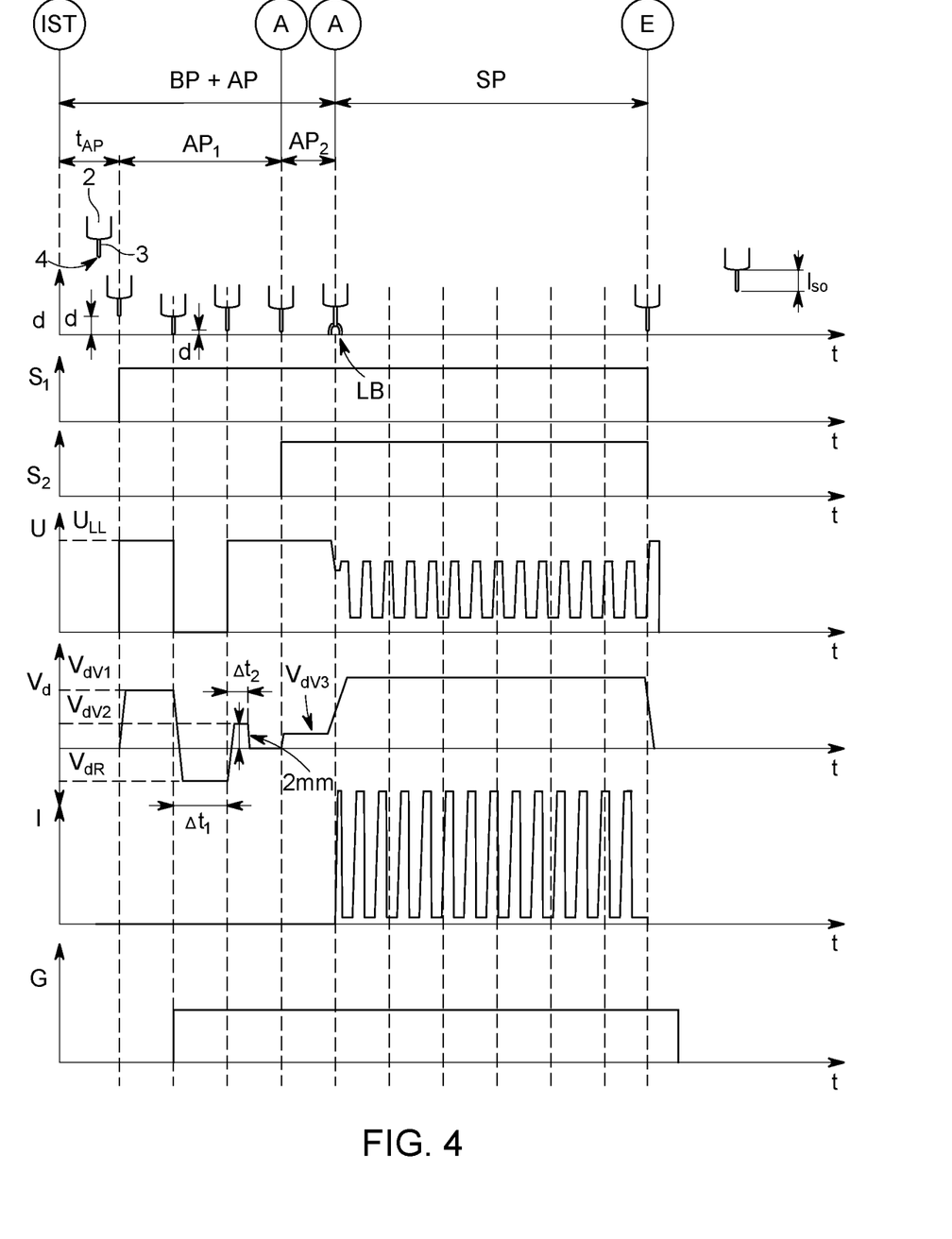
FIG. 4 shows the time courses of the positioning movement of a welding robot carrying the welding torch, of the distance of the end of the consumable welding wire from the workpiece, of the start command for the creep phase, of the welding start command, of the welding voltage, of the feed speed of the welding wire, of the welding current, and of the activation of the protective gas G prior to carrying out a welding process according to a second embodiment of the method according to the invention.

FIG. 4 shows the chronological sequences of the positioning movement of a welding torch 2 carried by the welding robot 10, of the distance d of the welding wire end 4 of the consumable welding wire 3 from the workpiece W, of the start command S1 for the creep phase AP, of the welding start command S2, of the welding voltage U, of the feed speed $v_d$ of the welding wire 3, of the welding current I, and of the activation of the protective gas G prior to carrying out a welding process SP according to a second embodiment of the method according to the invention. In contrast to the embodiment according to FIG. 3, the welding wire 3 is not stopped here after the backward movement after the detection of the first contact of the welding wire end 4 with the workpiece W, but is moved in the direction of the workpiece W at a specified second forward feed speed $v_{dv2}$. The forward movement of the welding wire 3 at the specified second forward feed speed $v_{dv2}$ can be carried out for a specified second time period $\Delta t_2$. This is preferably used when the used wire feed system (wire feed motor) has a higher inertia, whereby a larger distance of the welding wire end 4 to the workpiece W appears after the end of a backward movement. Due to the repeated forward movement of the welding wire 3 for a certain time period $\Delta t_2$, the distance is kept as small as possible. After detection of the next contact of the welding wire end 4 with the workpiece W, a backward movement of the welding wire away from the workpiece W could take place again at the backward feed speed $v_{dR}$ (not illustrated in FIG. 4). After reaching the start position A, the arc LB is ignited and the welding process SP is started. The supply of the protective gas G can take place again as a function of the detection of the first contact of the welding wire end 4 with the workpiece W or a specified time period $\Delta t_G$ after the detection of the contact. A specified time period $\Delta t_G$ of 0 s, i.e. a turn-on of the protective gas G immediately after the first contact of the welding wire end 4 with the workpiece W is also illustrated in FIG. 4. The specified time period $\Delta t_G$ is thus not illustrated explicitly in FIG. 4.

Here, the creep phase AP can also be divided into a first creep phase AP1, which is already carried out during the movement phase BP of the welding robot 10, and a second creep phase AP2, which is carried out after reaching the start position A of the welding seam X.

As suggested in the uppermost time diagram of the embodiment according to FIG. 4, the creep phase AP can also be carried out a specified period of time $\Delta t_{AP}$ after the start of the movement phase BP, thus after the start of the movement of the welding torch 2 from the actual position IST in the direction of the start position A. For example, this period of time $\Delta t_{AP1}$ can be between 200 ms and 2000 MS.

The present method for preparing an automated welding method for a welding process SP and the welding device 1 provided for this purpose for carrying out an automated welding method provides for a reduction of the time delay during the creep phase AP, whereby the welding process SP can be started more quickly and protective gas G can be saved as well.

The invention claimed is:

1. A method for preparing an automated welding method for a welding process, wherein a welding torch with a consumable welding wire is moved during a movement phase at a positioning speed from an actual position to a desired start position of a welding seam, which is to be produced during the welding process, and the distance of the end of the welding wire from the workpiece is bridged in that the welding wire is moved to the workpiece during a creep phase until the welding wire end contacts the workpiece, whereupon the welding process is started at the start position with ignition of an arc, wherein the creep phase is carried out at least partially during the movement phase, and the welding wire is moved in the direction of the workpiece at a first specified forward feed speed during the creep phase until a first contact of the welding wire end with the workpiece is detected, the welding wire is moved away from the workpiece after detection of the first contact, and the welding wire is then recurrently moved away from the workpiece and the contact is interrupted again in response to the detection of further contacts, and the movement of the welding wire to the workpiece until the welding wire end contacts the workpiece and movement away from the workpiece after the contact is repeated until the start position of the welding torch is reached, wherein a backward feed speed of the welding wire during the movement phase is larger than the positioning speed of the welding torch in the direction of the workpiece during the movement phase.

2. The method according to claim 1, wherein during the movement phase after detection of the first contact, the welding wire is moved away from the workpiece at a specified backward feed speed during a specified first time period, and the welding wire is then recurrently moved away from the workpiece in response to the detection of further contacts at a specified backward feed speed during a specified first time period.

3. The method according to claim 1, wherein the welding wire is moved at a specified second forward feed speed in the direction of the workpiece for a specified second time period during the movement phase after the backward movement of the welding wire from the workpiece after detection of a contact of the welding wire end with the workpiece.

4. The method according to claim 1, wherein the welding wire is moved a specified distance in the direction of the workpiece during the movement phase after the backward movement of the welding wire from the workpiece after detection of a contact of the welding wire end with the workpiece.

5. The method according to claim 1, wherein the creep phase is carried out for a specified period of time after the start of the movement phase.

6. The method according to claim 1, wherein the contact of the welding wire end with the workpiece is detected via a drop of the welding voltage.

7. The method according to claim 1, wherein the contact of the welding wire end with the workpiece is determined via a feed device for the welding wire.

8. The method according to claim 1, wherein the forward movement of the welding wire in the direction of the workpiece during the movement phase is stopped after reaching a specified maximum free wire length.

9. The method according to claim 8, wherein the forward movement of the welding wire in the direction of the workpiece during the movement phase prior to the first contact of the welding wire end with the workpiece is stopped after reaching a specified maximum free wire length of 5 mm to 50 mm.

10. The method according to claim 1, wherein the welding wire is moved in the direction of the workpiece during the creep phase at a first specified forward feed speed between 0.5 m/min and 200 m/min.

11. The method according to claim 3, wherein during the movement phase after the backward movement of the welding wire from the workpiece after detection of a contact of the welding wire end with the workpiece, the welding wire is moved in the direction of the workpiece at a specified second forward feed speed between 0.5 m/min and 200 m/min.

12. The method according to claim 2, wherein during the movement phase, the welding wire is moved away from the workpiece at a specified backward feed speed between 0.5 m/min and 200 m/min.

13. The method according to claim 1, wherein a protective gas is activated during the movement phase a specified time period after the detection of the first contact of the welding wire end with the workpiece.

14. A welding device for carrying out an automated welding method, comprising a welding torch with consumable welding wire, a welding current source, a feed device for the welding wire, and a control device, wherein the control device is formed for carrying out the method according to claim 1.

15. The method according to claim 1, wherein the backward feed speed is adapted individually in response to each movement of the welding wire away from the workpiece until the start position of the welding torch is reached.

16. The method according to claim 1, wherein the backward feed speed of the welding wire during the movement phase is on average at least 1.5 times larger than the positioning speed of the welding torch in the direction of the workpiece during the movement phase.

17. The method according to claim 16, wherein the backward feed speed of the welding wire during the movement phase is on average at least 2 times larger than the positioning speed of the welding torch in the direction of the workpiece during the movement phase.

18. The method according to claim 17, wherein the backward feed speed of the welding wire during the movement phase is on average at least 5 times larger than the positioning speed of the welding torch in the direction of the workpiece during the movement phase.

19. The method according to claim 9, wherein the forward movement of the welding wire in the direction of the workpiece during the movement phase prior to the first contact of the welding wire end with the workpiece is stopped after reaching a specified maximum free wire length of 20 mm to 30 mm.

* * * * *